US008199340B2

(12) United States Patent
Suzuki (10) Patent No.: US 8,199,340 B2
(45) Date of Patent: Jun. 12, 2012

(54) IMAGE FORMING APPARATUS, IMAGE FORMING SYSTEM, RECORDING MEDIUM, AND METHOD FOR CONTROLLING IMAGE FORMING APPARATUS

(75) Inventor: Masataka Suzuki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1320 days.

(21) Appl. No.: 11/756,004

(22) Filed: May 31, 2007

(65) Prior Publication Data

US 2007/0279663 A1 Dec. 6, 2007

(30) Foreign Application Priority Data

May 31, 2006 (JP) .................... 2006-152300

(51) Int. Cl.
*G06F 15/00* (2006.01)
(52) U.S. Cl. .................. 358/1.14; 358/1.1; 358/1.9
(58) Field of Classification Search .................. 358/1.9, 358/1.15, 1.1, 1.5, 1.4
See application file for complete search history.

(56) References Cited

U.S. PATENT DOCUMENTS

| | | | |
|---|---|---|---|
| 6,348,977 B1 * | 2/2002 | Ooki .................. | 358/1.9 |
| 6,773,176 B2 * | 8/2004 | Kurosawa .................. | 400/76 |
| 7,365,865 B2 * | 4/2008 | Kidani et al. .................. | 358/1.13 |

FOREIGN PATENT DOCUMENTS

| | | |
|---|---|---|
| JP | 9277606 | 10/1997 |
| JP | 11020241 | 1/1999 |
| JP | 2001199130 | 7/2001 |
| JP | 2002006579 | 1/2002 |
| JP | 2004170654 | 6/2004 |

* cited by examiner

*Primary Examiner* — King Poon
*Assistant Examiner* — Iriana Cruz
(74) *Attorney, Agent, or Firm* — Banner & Witcoff, Ltd.

(57) ABSTRACT

An image forming apparatus includes image carriers on which latent images are respectively formed, development sections for respectively developing the formed latent images using development agents, a transfer section for superimposing and transferring the development agents developing the latent images formed on the image carriers on a sheet, an input section into which the image data are input, an analysis section for analyzing whether the image data input into the input section is monochrome image data, an identification information storage section for storing identification information capable of identifying the image data when the analysis section analyzes that the image data is monochrome image data, and a control section for prohibiting at least the operation of the development sections corresponding to some colors when the identification information of the image data input into the input section corresponds to the identification information stored in the identification information storage section.

11 Claims, 8 Drawing Sheets

IMAGE FORMING APPARATUS, IMAGE FORMING SYSTEM, RECORDING MEDIUM, AND METHOD FOR CONTROLLING IMAGE FORMING APPARATUS

CROSS-REFERENCE TO RELATED APPLICATION

This application claims priority from Japanese Patent Application No. 2006-152300 filed on May 31, 2006, the entire subject matter of which is incorporated herein by reference.

TECHNICAL FIELD

Aspects of the present invention relate to an image forming apparatus which forms an image on a sheet electrophotographically. In particular, the present invention relates to an image forming apparatus which can form a multicolor image, an image forming system including the image forming apparatus and a higher-level apparatus, a recording medium for controlling the image forming apparatus or the higher-level apparatus, and a method for controlling the image forming apparatus for controlling the image forming apparatus.

BACKGROUND

An image forming apparatus has been considered, which is provided with a plurality of image carriers on which latent images according to image data respectively corresponding to different colors is formed, a plurality of development sections which respectively develop the latent images formed on the image carriers using development agents having different colors, and a transfer section for superimposing and transferring the development agents which develop the latent images formed on the image carriers on a sheet. In the image forming apparatus of this kind, there are provided an image carrier such as a photoconductor drum for each color such as yellow, magenta, cyan and black, and a development section such as a development roller. On the image carrier, an electrostatic latent image according to the imaged at a corresponding to each color is formed. The electrostatic latent image corresponding to each color is developed by the development agent having each color by the development section. Thus, the development agent having each color which develops the electrostatic latent image corresponding to each color is superimposed and transferred on a media to be recorded such as a sheet by the transfer section, thereby forming a multicolor image on the sheet.

In the image forming apparatus of this kind, in all cases, the image is not formed using the development agents having all colors. For example, the monochrome image may be formed using only some development agents such as only black. Thus, JP-A-2004-170654 discloses that, when the monochrome image is formed, the stopping of the development roller corresponding to colors other than black. Thereby, the degradation or depletion of the development agent of the colors other than black can be suppressed.

Herein, it is considered to be judged whether the monochrome image or the color image is formed, based on data of a header or the like attached in transmitting the image data from a personal computer (herein after, referred to as a "PC") as a higher-level apparatus to the image forming apparatus. However, when a user instructs color printing using a printer driver of the PC even if the image data is monochrome, data for forming the color image is attached to the image data. Then, the image carriers and development sections corresponding to all colors are driven, and as described above, the degradation or depletion of the development agents having colors other than black cannot be suppressed.

All the input image data are analyzed without referring to data such as the header, and it is also considered that the image formation is started based on the analysis result. In this case, prior to the image formation, it can be correctly known by the analysis whether the image data is monochrome. However, when starting the image formation after analyzing all the input image data each time, the time required for the image formation becomes too long, which is not practical.

SUMMARY

Aspects of the invention provide an image forming apparatus which can prohibit the operation of the development sections corresponding to some colors when the image data is monochrome to promptly and exactly suppress the degradation and depletion of the development agent of the color, an image forming system, a recording medium, and a method for controlling the image forming apparatus.

DETAILED DESCRIPTION

<General Overview>

According to an aspect of the invention, an image forming apparatus includes: a plurality of image carriers on which latent images according to image data corresponding to different colors are respectively formed; a plurality of development sections for respectively developing the latent images formed on the image carriers using development agents having different colors; a transfer section for superimposing and transferring the development agents developing the latent images formed on the image carriers on a sheet; an input section into which the image data are input; an analysis section for analyzing whether the image data input into the input section is monochrome image data; an identification information storage section for storing identification information capable of identifying the image data when the analysis section analyzes that the image data is monochrome image data; and a control section for prohibiting at least the operation of the development sections corresponding to some colors when the identification information of the image data input into the input section corresponds to the identification information stored in the identification information storage section.

According to another aspect of the invention, a computer readable medium storing a software program to control an image forming apparatus that includes: a plurality of image carriers on which latent images according to image data corresponding to different colors are respectively formed; a plurality of development sections for respectively developing the latent images formed on the image carriers using development agents having different colors; a transfer section for superimposing and transferring the development agents developing the latent images formed on the image carriers on a sheet; and an input section into which the image data are input, the software program enabling a computer to function as: an analysis section for analyzing whether the image data input into the input section is monochrome image data; an identification information storage section for storing identification information capable of identifying the image data when the analysis section analyzes that the image data is monochrome image data; and a control section for prohibiting at least the operation of the development sections corresponding to some colors when the identification information of the image data input into the input section corresponds to the identification information stored in the identification information storage section.

According to still another aspect of the invention, an image forming system of the present invention including: an image forming apparatus for forming an image on a sheet including: an input section into which the image data are input; a plurality of image carriers on which latent images according to image data corresponding to different colors of the image data input into the input section are respectively formed; a plurality of development sections for respectively developing the latent images formed on the image carriers using development agents having different colors; and a transfer section for superimposing and transferring the development agents developing the latent images formed on the image carriers on the sheet; and a higher-level apparatus connected to the image forming apparatus including: a data output section for outputting image data to the input section of the image forming apparatus; an analysis section for analyzing whether the image data output by the data output section is monochrome image data; an identification information storage section for storing identification information capable of identifying the image data when the analysis section analyzes that the image data is monochrome image data; and a command output section for outputting a command for prohibiting at least the operation of the development sections corresponding to some colors to the image forming apparatus when the identification information of the image data output by the data output section corresponds to the identification information stored in the identification information storage section.

According to still another aspect of the invention, a method for controlling an image forming apparatus of the present invention, the image forming apparatus including: a plurality of image carriers on which latent images according to image data corresponding to different colors are respectively formed; a plurality of development sections for respectively developing the latent images formed on the image carriers using development agents having different colors; a transfer section for superimposing and transferring the development agents developing the latent images formed on the image carriers on a sheet; the method including: analyzing whether the image data input into the image forming apparatus is monochrome image data; storing identification information capable of identifying the image data when the image data is analyzed to be monochrome image data; and prohibiting at least the operation of the development sections corresponding to some colors when the identification information of the image data newly input into the image forming apparatus corresponds to stored identification information.

<Illustrative Aspects>

Figure 1:
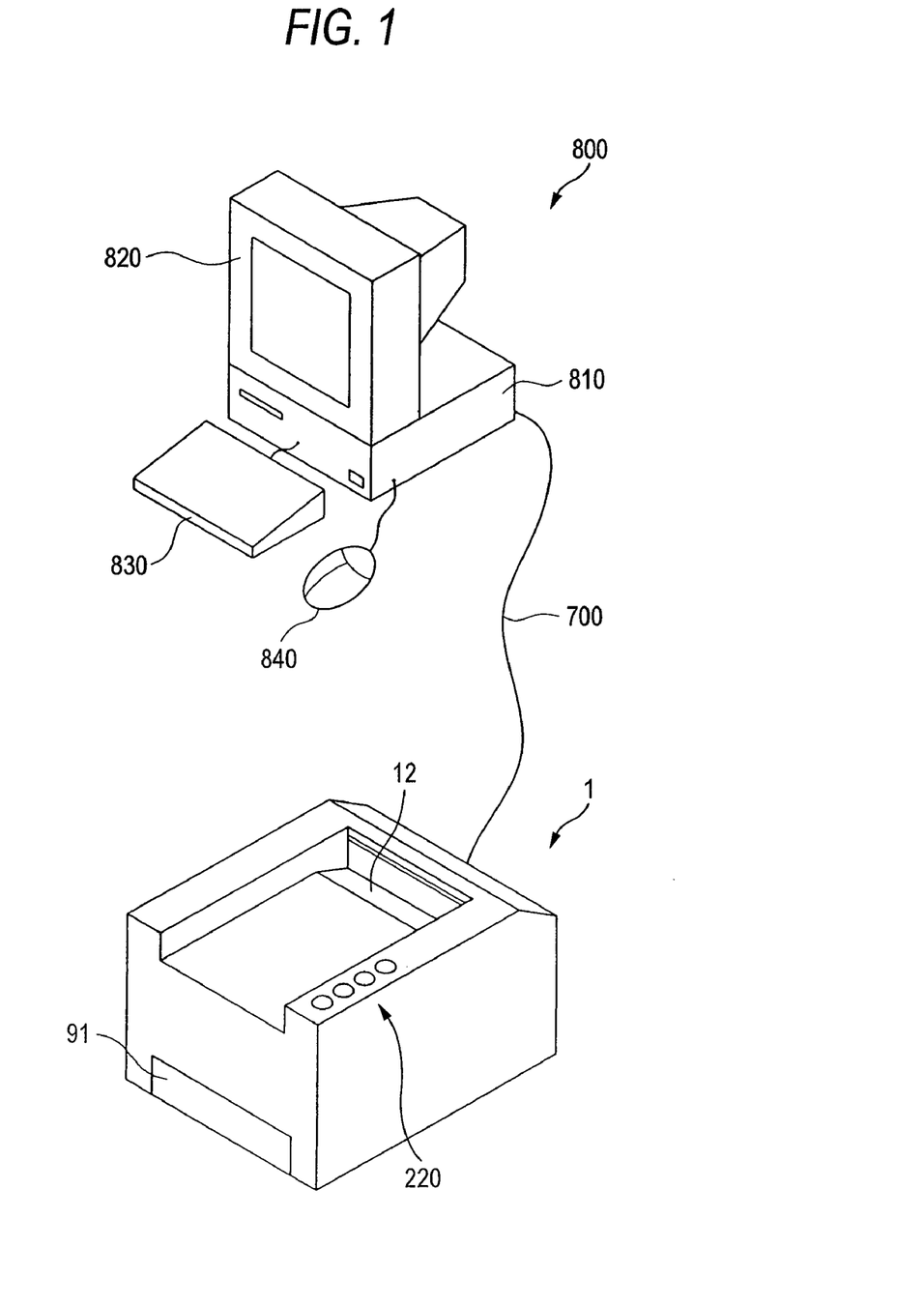
FIG. 1 is an appearance view showing an image forming system.

Illustrative aspects of the present invention will be described with reference to the drawings. FIG. 1 is an appearance view showing an image forming system. As shown in FIG. 1, an image forming system of this aspect includes a color laser printer (herein after, referred simply to as a "printer") 1 as an image forming apparatus, and a personal computer (herein after, referred simply to as a "PC") 800 as a higher-level apparatus connected to the printer 1 via a cable 700. The printer 1 may be connected to the PC 800 via networks such as a LAN, and infrared communication or the like.

Figure 2:
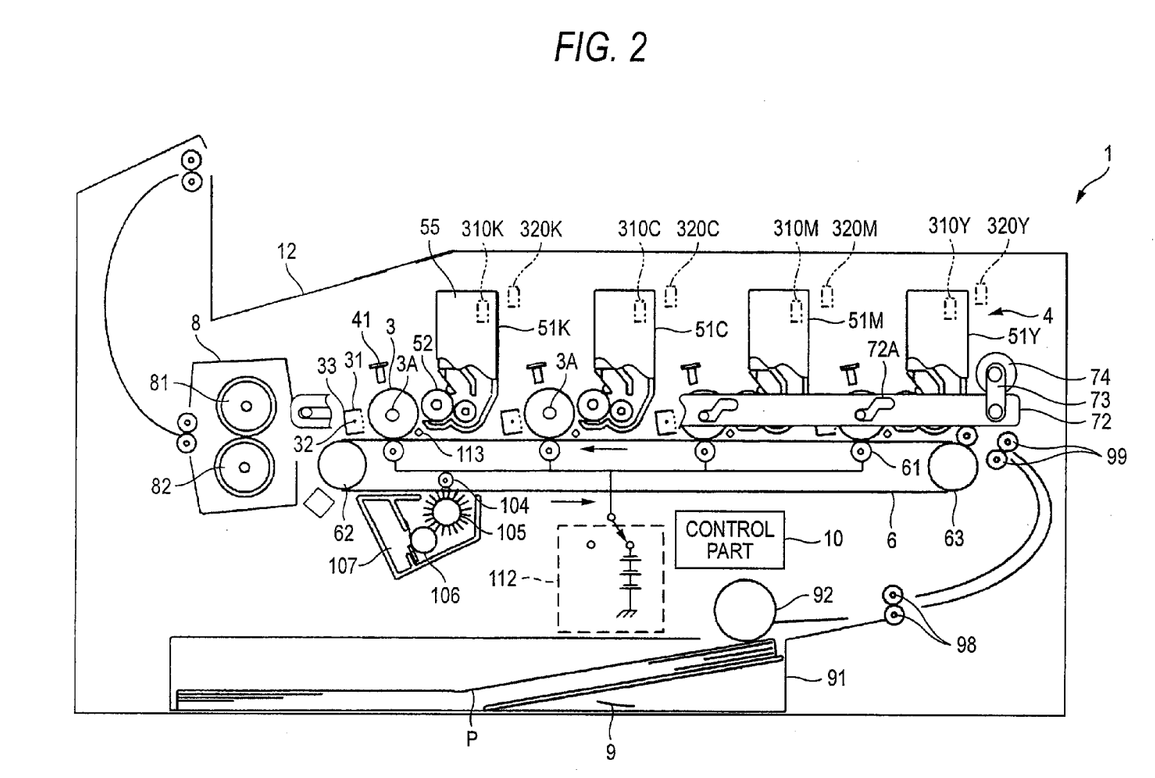
FIG. 2 is a schematic section al view showing an internal structure of a color laser printer of the image forming system.

FIG. 2 is a schematic section al view showing the internal structure of the printer 1. The printer 1 illustrated in FIG. 2 is provided with a toner image forming part 4, a sheet feeding belt 6, a fixing part 8, a sheet-feeding part 9, a stacker 12 and a control part 10. The printer 1 forms four-color images according to image data input from the outside on a sheet P.

The toner image forming part 4 is provided with four development units 51Y, 51M, 51C, 51K, photoconductor drums 3 as an example of an image carrier for each of four toner image forming processes due to toners of yellow, magenta, cyan and black as an example of development agents stored in the development units 51Y, 51M, 51C, 51K, electrifiers 31 which uniformly electrify the photoconductor drums 3, and scanner units 41 which expose the surface of the electrified photoconductor drum 3 with a laser be am to form an electrostatic latent image according to the image data. The illustration of the scanner unit 41 is largely omitted, and only a part from which the laser be am is fin ally emitted is illustrated.

Herein after, the structure of each of the components will be described in detail. When distinction for each color is required in the following description, the subscripts of Y (yellow), M (magenta), C (cyan) and K (black) are given to the numerals of the parts. When the distinction is not required, the subscripts are omitted.

The four photoconductor drums 3 of the toner image forming part 4, which are composed of a substantially cylindrical member, are rotatably and horizontally arranged at even intervals. For the substantially cylindrical member of the photoconductor drum 3, a member prepared by forming a positive charge photosensitive layer on, for example, an aluminum base material is used. This aluminum base material is grounded to a ground line of the printer 1.

The electrifier 31, which is a so-called scorotron type electrifier, includes an electrification wire 32 extending in the width direction so as to face the photoconductor drum 3, and a shield case 33 which stores the electrification wire 32, and of which the photoconductor drum 3 side is opened. The surface of the photoconductor drum 3 is positively electrified (for example, +700V) by applying a high voltage to the electrification wire 32. The shield case 33 has a structure where grids are provided in the opening part of the photoconductor drum 3 side. The surface of the photoconductor drum 3 is electrified to nearly the same potential as that of a grid voltage by applying a specified voltage to the grids.

The scanner unit 41 is arranged at the downstream side further than the electrifier 31 in the rotational direction of the photoconductor drum 3 for each of the photoconductor drums 3, emits a laser be am according to one color of the image data input from the exterior from a light source to each photoconductor drum 3, and scans the laser be am using the mirror surface or the like of a polygon mirror rotated and driven by a polygon motor to irradiate the surface of the photoconductor drum 3 with the laser be am.

When the scanner unit 41 irradiates the surface of the photoconductor drum 3 with the laser beam according to the image data, the surface potential of the irradiated part is reduced (+150 to +200V), thereby forming the electrostatic latent image on the surface of the photoconductor drum 3.

The development units 51Y, 51M, 51C, 51K respectively have a structure where a development roller 52 as an example of a development section is provided in the development unit case 55 which stores the toner of each of the colors. The development roller 52 is arranged at the downstream side further than the scanner unit 41 to the rotational direction of the photoconductor drum 3 so as to come into contact with the photoconductor drum 3. Each of the development units 51 electrifies the toner to a "plus" (positive), and supplies the toner to the photoconductor drum 3 as a uniform thin layer. In the contact part between the development roller 52 and the photoconductor drum 3, the toner electrified to a "plus" (positive) to the "plus" (positive) electrostatic latent image formed on the photoconductor drum 3 is supported by a reversal development method to develop the electrostatic latent image.

The development roller 52 is formed into a cylindrical shape using a conductive silicone rubber or the like as a base material. On the surface of the development roller 52, a resin containing fluoride or a coat layer made of a rubber material is formed. The toner stored in the development unit case 55 is a positive charge type nonmagnetic monocomponent toner, and the toners of yellow, magenta, cyan and black are respectively stored according to the development units 51Y, 51M, 51C, 51K.

The sheet-feeding part 9, which is provided at the lowest part of the device, includes a storing tray 91 which stores sheet P and a pickup roller 92 which sends out the sheet P. The sheet P stored in the storing tray 91, which is taken out one sheet at a time from the sheet-feeding part 9 by the pickup roller 92, is fed to the sheet feeding belt 6 via a feeding roller 98 and a registration roller 99.

The sheet feeding belt 6, which has a width narrower than that of the photoconductor drum 3, is constituted into an endless shape so that the sheet feeding belt 6 travels with the sheet P in a state where the sheet P is supported on the upper surface of the sheet feeding belt 6. The sheet feeding belt 6 is wrapped around between a driving roller 62 and a driven roller 63. Transfer rollers 61 as an example of a transfer section are respectively provided near positions facing the photoconductor drums 3, and are provided across the sheet feeding belt 6. As shown in FIG. 2, the surface of the sheet feeding belt 6 facing the photoconductor drum 3 is moved to the left direction from the right direction in FIG. 2 by the rotation of the driving roller 62 to feed the sheet P to be sent from the registration roller 99 in order between the sheet feeding belt 6 and the photoconductor drum 3 and to send the sheet P to the fixing part 8. On the surface of the sheet feeding belt 6 turned up at the driving roller 62, a cleaning brush 105 is provided.

A transfer bias (for example, −10 to −15 μA) having a polarity reverse to the electrification polarity of the toner is applied between the transfer roller 61 and the photoconductor drums 3 by a current source 112, and thereby the transfer roller 61 transfers the toner image formed on the photoconductor drum 3 on the sheet P fed by the sheet feeding belt 6. Although the current source 112 is constituted so that the transfer bias can be switched to two kinds of 0V and a constant voltage in FIG. 2, the current source 112 is illustrated for convenience, and can actually control a voltage at further multiple steps. Furthermore, between the development roller 52 and the transfer roller 61, there is provided a toner amount sensor 113 for detecting the amount of the toner supported on the surface of the photoconductor drum 3.

The cleaning brush 105 is structured so that brushes are provided around a substantial cylindrical member extending in the width direction of the sheet feeding belt 6, and a predetermined potential difference is applied between the cleaning brush 105 and an electrode roller 104 provided at a position facing across the sheet feeding belt 6. The cleaning brush 105 is provided with a waste toner remover 106 which removes the toner adhered to the cleaning brush 105 from the cleaning brush 105, and a storage box 107 which stores the toner removed from the cleaning brush 105.

The fixing part 8 includes a heating roller 81 and a pressurizing roller 82, fixes toner image on the sheet P by heating and pressurizing the sheet P on which the toner image is transferred while the sheet P is held and fed by the heating roller 81 and the pressurizing roller 82.

The stacker 12 is formed on the upper surface of the printer 1. This stacker 12, which is provided at the discharge side of the fixing part 8, stores the sheet P discharged from the fixing part 8. As described later, the control part 10, which includes a microcomputer using a CPU 10A (see FIG. 4), controls the overall operations of the printer 1.

Meanwhile, each of three photoconductor drums 3Y, 3M, 3C corresponding to yellow, magenta and cyan is movably held in an upper direction where the photoconductor drum 3 is separated from the sheet feeding belt 6. The photoconductor drums 3Y, 3M, 3C are positioned by a moving member 72 provided so as to bridge over four photoconductor drums 3. The moving member 72, which is a plate-shaped member having a length bridging over the four photoconductor drums 3, is movably held in a horizontal direction in FIG. 2. On the moving member 72, there are formed three guiding holes 72A having a substantially crank shape extending in the horizontal direction. Shafts 3A provided on the side surfaces of the photoconductor drums 3Y, 3M, 3C in the longitudinal direction are respectively inserted into the respective guiding holes 72A.

Figure 3:
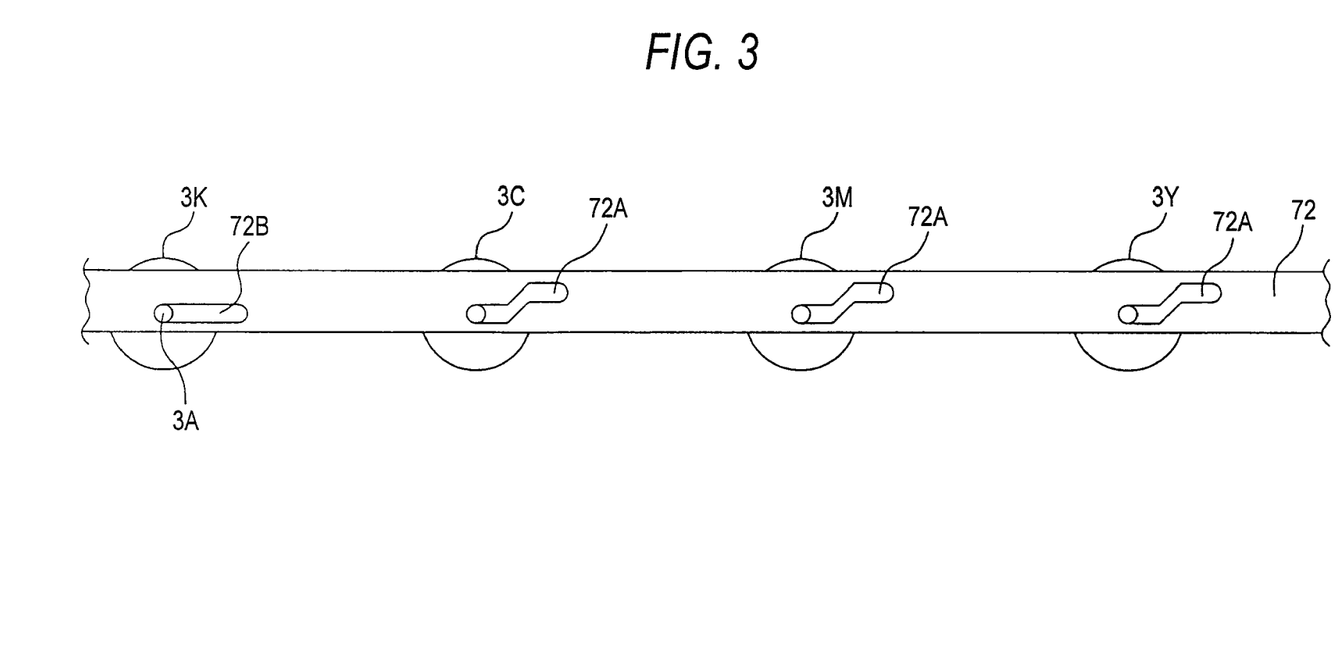
FIG. 3 illustrates a moving mechanism of photoconductor drums.

On the moving member 72, there is provided a motor 74 via a link 73 for changing the rotational force to the force of the horizontal direction. The rotation of the motor 74 according to command signals from the control part 10 moves the moving member 72 in the right or left direction. Thus, when the guiding hole 72A is moved in the left direction, the shafts 3A of the photoconductor drums 3Y, 3M, 3C are moved in the upper direction along the substantially crank shape of the guiding hole 72A in the case where the guiding hole 72A is moved in the left direction. Thereby, the photoconductor drum 3 is separated from the sheet feeding belt 6. On the contrary, when the moving member 72 is in the right position, the photoconductor drum 3 comes into contact with the sheet feeding belt 6. As shown in FIG. 3, the shaft 3A of the photoconductor drum 3K corresponding to black, which is fit into the guiding hole 72B linearly-formed in the horizontal direction on the moving member 72, always comes into contact with the sheet feeding belt 6 regardless of the movement in the horizontal direction of the moving member 72. Usually, the image is formed with four photoconductor drums 3 coming into contact with the sheet feeding belt 6.

In the printer 1 of this aspect having the above structure, the operation of the image formation on the sheet P is as follows. First, one sheet P is supplied from the sheet-feeding part 9 by the pickup roller 92, and is sent to the sheet feeding belt 6 via the feeding roller 98 and the registration roller 99. Next, the surface of the rightmost photoconductor drum 3Y in FIG. 2 is uniformly electrified by the electrifier 31, and is exposed to correspond to the image data input from the outside for yellow color by the scanner unit 41 to form the electrostatic latent image as described above. Next, the yellow toner positively electrified in the development unit 51Y is supplied to the surface of the photoconductor drum 3Y to conduct the development. The toner image thus formed is transferred by the transfer roller 61 on which transfer bias is applied on the surface of the sheet P fed by the sheet feeding belt 6.

The sheet P is then fed in order to a position where the sheet P faces each of the photoconductor drums 3 for magenta, cyan and black. The toner image is formed on the surface of the photoconductor drum 3 in the same procedure as that of the yellow toner, and is superimposed and transferred on the sheet P by the transfer roller 61. Finally, the four toner images formed on the sheet P is fixed on the sheet P in the fixing part 8, and is then discharged on the stacker 12.

Furthermore, as shown at the virtual line of FIG. 2, IC tags 310Y to 310K indicating information such as serial number of the development unit 51 are attached to the development unit case 55 which can be detached and attached to the printer 1. IC tag readers 320Y to 320K which read the IC tag are provided at the main body side of the printer 1.

Figure 4:
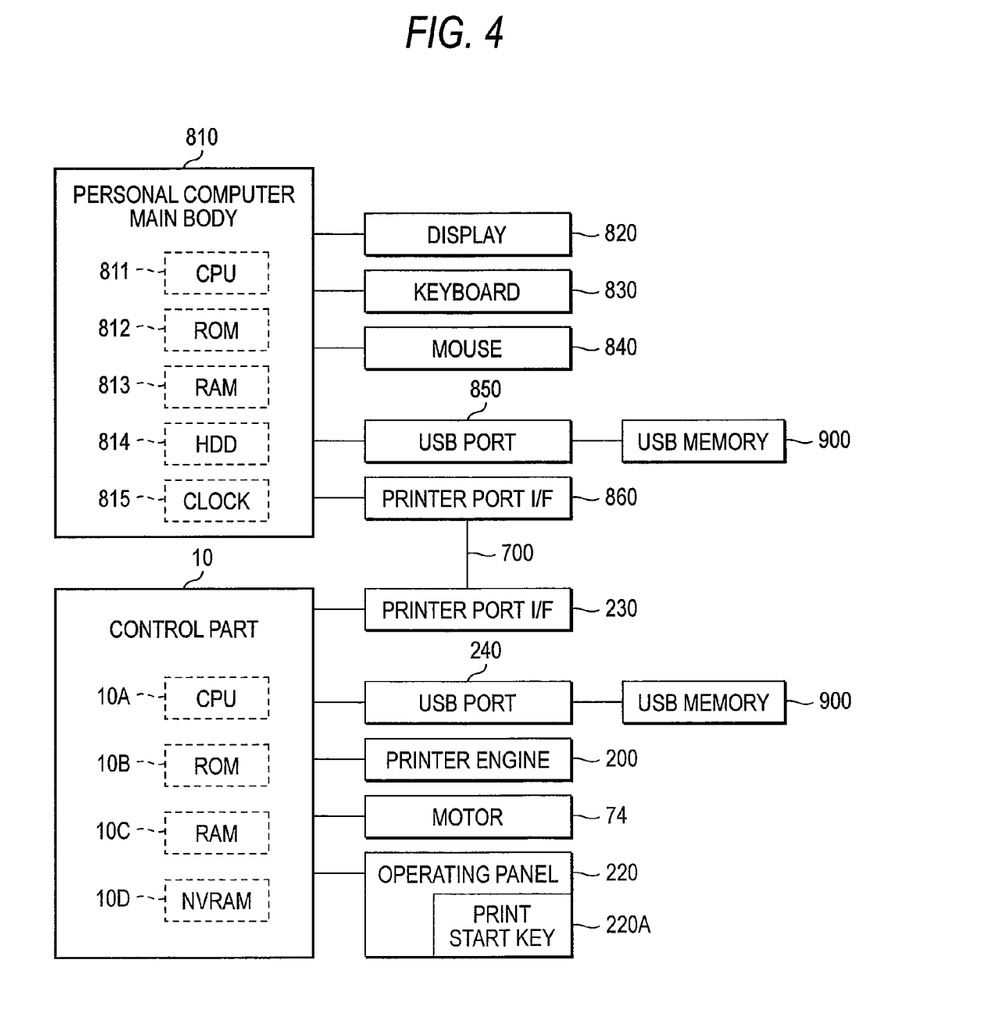
FIG. 4 is a block diagram showing a control system in the image forming system.

Next, FIG. 4 is a block diagram showing the structure of a control system in this image forming system. As shown in FIG. 4, a personal computer main body 810 of the PC 800 is provided with a CPU 811, a ROM 812, a RAM 813, a hard disk drive unit (HDD) 814, and a clock 815. To the PC main body 810, a display 820 such as a CRT, a keyboard 830, and a mouse 840 are connected (see FIG. 1). Furthermore, to the PC main body 810, a USB port 850 to which a USB memory 900 can be attached, and a printer port interface (printer port I/F) 860 as an example of a data output section for connecting to the printer 1 are also connected.

The control part 10 of the printer 1 is constituted as a microcomputer provided with a CPU 10A, a ROM 10B and a RAM 10C. Furthermore, the control part 10 is provided with an NVRAM 10D as an identification information storage section which prevents memory contents from disappearing even if the power switch is turned off. To the control part 10, various actuators (herein after, also referred to as a "printer engine 200") having a structure leading to the fixing part 8 from the sheet-feeding part 9, the motor 74, an operating panel 220 (see FIG. 1) containing a print start key 220A provided on the surface of the printer 1, a printer port interface (printer port I/F) 230 as an example of an input section for connecting to the PC 800, and a USB port 240 as an example of the input section to which the USB memory 900 can be attached are connected.

Figure 5:
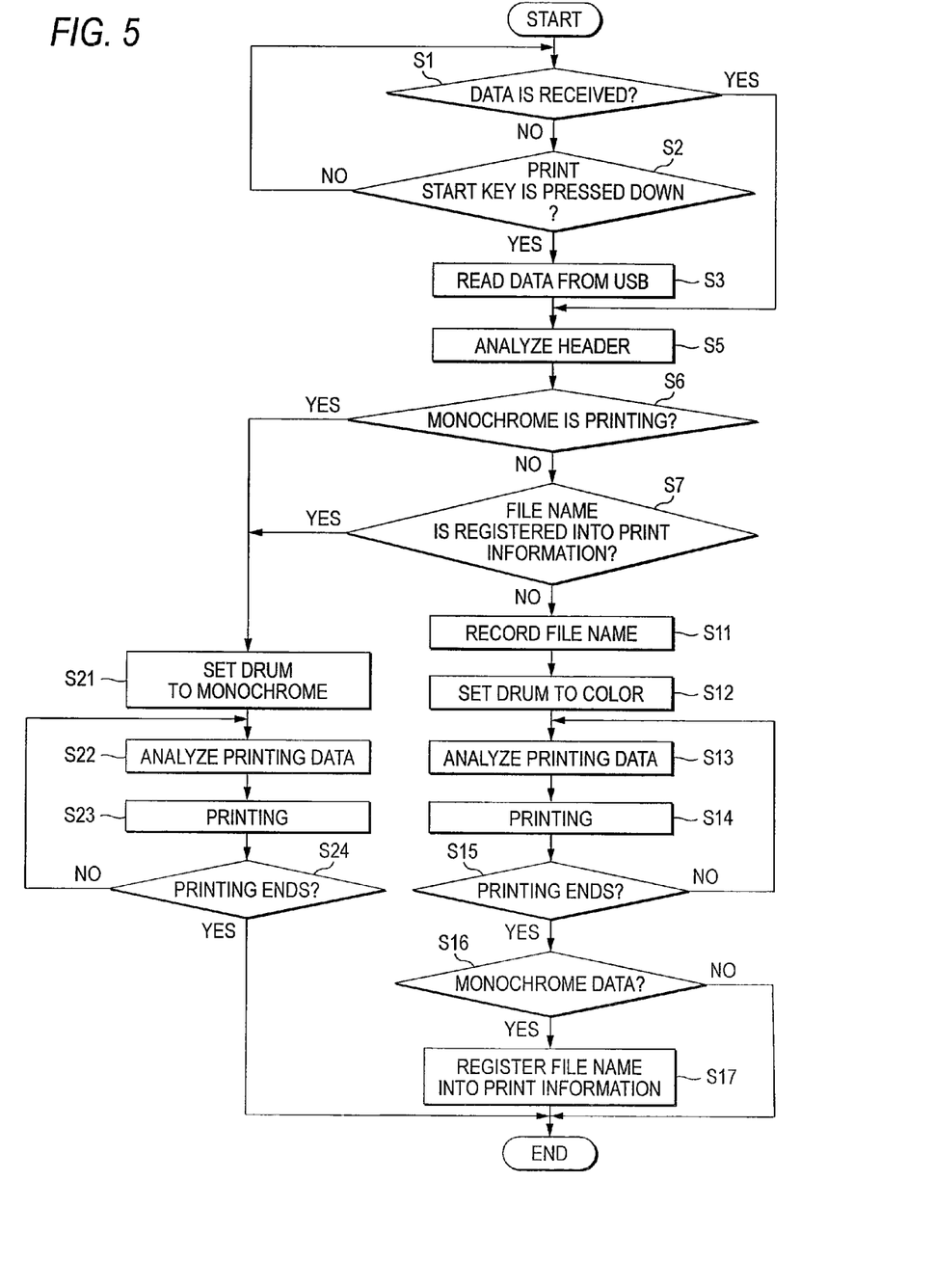
FIG. 5 is a flowchart showing a print processing to be executed at a printer side of the control system.

Next, the processing expected by this control system will be described. FIG. 5 is a flowchart showing print processing in which the CPU 10A of the control part 10 executes based on a program stored in the ROM 10B as a recording medium. This processing is repeatedly executed after the power activation of the printer 1.

When the processing is started, first, it is judged whether the printer 1 receives printing data which includes a file name and a file update date/time as an example of the image data from the PC 800 in S1 (S represents a step, herein after, the same). When the printing data is not received (S1: N), it is judged whether the print start key 220A of the operating panel 220 is pressed down in S2. When the print start key 220A is not pressed down (S2: N), the processing proceeds to S1. The processing stands by until the printing data is received (S1:Y) or the print start key is pressed down (S2: Y) by the loop processings of S1 and S2.

When the print start key 220A is pressed down during the loop processings of S1, S2 (S2:Y), the printing data including the file name and the file update date/time is read from the USB memory 900 attached to the USB port 240 in (S2:Y) in the following S3, and the processing then proceeds to S5. When the printing data is received during the loop processings of S1, S2 (S1: Y), the processing proceeds to S5 as it is. In S5, the header of the printing data received or read is analyzed, and it is judged whether data which indicates monochrome printing is attached to the header in the following S6.

Figure 6:
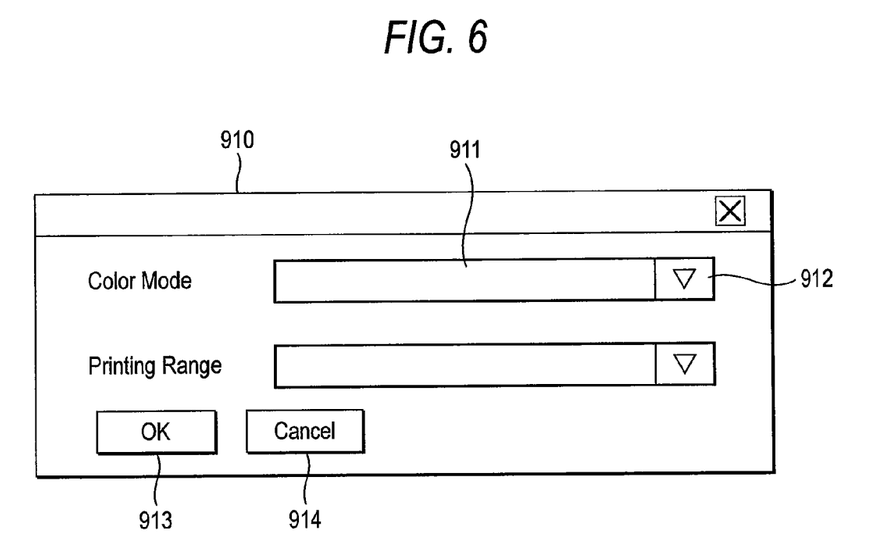
FIG. 6 illustrates Printing UI in a PC of the control system.

Herein, when the printing data is transmitted from the PC 800, a printing user interface (herein after, referred to as a "printing UI") 910 (see FIG. 6) for inputting various setting information such as a color mode and a printing range is displayed on the display 820 by a printer driver. As illustrated in FIG. 6, a text input part 911 and a candidate display button 912 are respectively provided for each setting information such as the color mode and the printing range in this printing UI 910. Furthermore, there are provided an OK button 913 and a cancel button 914.

Usually, a user performs proper text input in the text input part 911 from the keyboard 830 to this printing UI 910, or clicks the candidate display button 912 using the mouse 840 (herein after, merely referred to as "pressing the candidate display button 912 down," the other buttons are also the same) to select a proper candidate and to display the candidate on the text input part 911, and presses the OK button 913 down. Then, the PC 800 attaches data which indicates the contents displayed on the text input part 911 as a header to the printing data to be transmitted, and transmits the header and the printing data from the printer port interface 860. The file name and file update date/time of the printing data as identification information are also recorded in the header. When the cancel button 914 is pressed down, the transmission of the printing data is interrupted. The file update date/time may be the file update date.

When the printing data is read from the USB memory 900 (S3), the data (herein after, also referred to as a "header") equivalent to the header is attached in the control part 10. Although data which indicates color printing in default set is attached with data of the file name and the file update date/time to the header in this case, data which indicates the monochrome printing by set can be attached.

Then, in S5 of FIG. 5, the header is analyzed. It is judged in S6 whether the monochrome printing is instructed based on the analysis result of the header. When the monochrome printing is not instructed such as the instruction of the color printing (S6: N), it is judged whether the file name of the printing data is registered into print information in S7 as an example of a control section. As described later, when the printing data that the printing (image formation) is conducted is the monochrome printing data (S16:Y), the printer 1 of this aspect registers the file name and file update date/time of the printing data as the print information in the NVRAM 10D (S17). However, this print information is empty at the time of the shipment of the printer 1. Then, immediately after the purchase of the printer 1, a negative judgment is conducted in S7, and the processing proceeds to S11.

In S11, the file name and file update date/time of the printing data are recorded on the RAM 10C, and the photoconductor drum 3 is set to color in the following S12. That is, in S12, the motor 74 is driven, and all of four photoconductor drums 3 come into contact with the sheet feeding belt 6. In S13 as an example of the following analysis section, the printing data is analyzed, and the printer engine 200 is actually driven in S14 based on the analysis result to execute the printing as described above. In the following S15, it is judged whether the printing to all the printing data is completed.

When the printing data is not completed (S15: N), the processing proceeds to S13, and the processings of S13, S14 are repeated.

Figure 7:
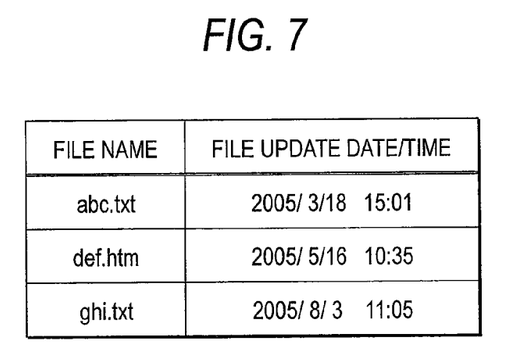
FIG. 7 illustrates print information used for the print processing.

When the printing is completed (S15:Y), it is judged in S16 whether the printing data is monochrome data, and more specifically, whether the printing is conducted without using the toners of yellow, magenta, and cyan completely. When the printing data is multicolor data (S16: N), the processing ends once as it is. On the other hand, when the printing data is monochrome data (S16: Y), the file name and file update date/time of the printing data are registered into the NVRAM 10D as the print information illustrated in FIG. 7 in S17 as an example of a file name memory section, and the processing ends once.

When the monochrome printing was instructed to the printing data (S6: Y), or when the file name and file update date/time of the printing data has already been registered into the print information (S7: Y), the processing proceeds to S21.

The photoconductor drum 3 is set to monochrome in S21. That is, the motor 74 is driven, and the photoconductor drums 3Y, 3M, 3C are isolated from the sheet feeding belt 6. In the following S22, the printing data is analyzed, and the monochrome printing in which the printer engine 200 is actually driven in S23 and only the toner of black is used is executed based on the analysis result. In a state where the photoconductor drums 3Y, 3M, 3C are isolated from the sheet feeding belt 6 as described above, the printing is conducted with the photoconductor drums 3Y, 3M, 3C and the development rollers 52Y, 52M, 52C are stopped. In the following S24, it is judged whether the printing to all printing data is completed. When the printing is not completed (S24: N), the processing proceeds to S22, and the processings of S22, S23 are repeated. When the printing is completed (S24: Y), the processing ends once as it is.

Thus, when the printing data is judged to have been the monochrome data after the printing end (S16: Y) even in the case where the monochrome printing is not instructed to the printing data which is received from the PC 800 or is read from the USB memory 900 (S6: N) in the image forming system of this aspect, the file name and the file update date/time of the printing data are registered as the print information (S17). When the file name and file update date/time of the printing data are registered into the print information (S7: Y) even in the case where the color printing is instructed to the printing data which is newly received from the PC 800 or is newly read from the USB memory 900 (S6: N), the photoconductor drum 3 is set to monochrome, and the printing is conducted (S21 to S24). That is, the photoconductor drums 3Y, 3M, 3C are isolated from the sheet feeding belt 6, and the printing is conducted in a state in which the photoconductor drums 3Y, 3M, 3C and also the development rollers 52Y, 52M, 52C are stopped. Therefore, the degradation or depletion of the toners of yellow, magenta and cyan in printing the monochrome printing data can be promptly and exactly suppressed.

When the monochrome printing is instructed by the printing UI 910 in this aspect (S6: Y), the processing does not proceed to the analysis processing in S13 and the registration processing of the file name in S17 to cause the following effects. In the printing UI 910, origin ally, the monochrome printing may be instructed also to multicolor printing data. In this case, since the printing data is converted into monochrome by the PC 800 and is input into the printer 1, the file name and file update date/time of the printing data will be registered into the print information when the processing following S13 is executed to the printing data. On the other hand, since the processing can be transferred to S17 only when the monochrome printing is not instructed by the printing UI 910 (S6: N) in this aspect, the file name of the multicolor printing data can be prevented from being accidentally registered into the print information. In this aspect, the file name and the file update date/time are registered into the print information in pairs. Therefore, since the file update date/time differs when the printing data of the same file name is converted into color from monochrome, the negative judgment is conducted in S7, and the printing data can be color-printed.

Figure 8:
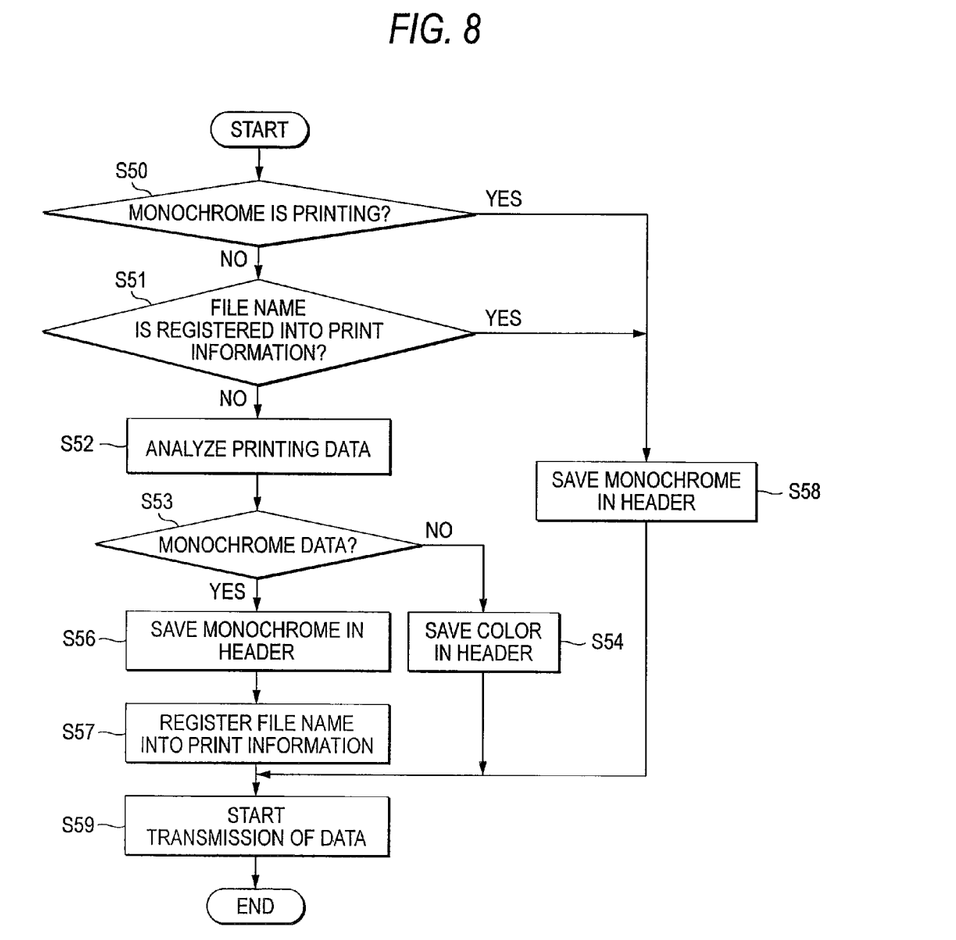
FIG. 8 is a flowchart showing the modification of processing of a PC side in the control system.
Figure 9:
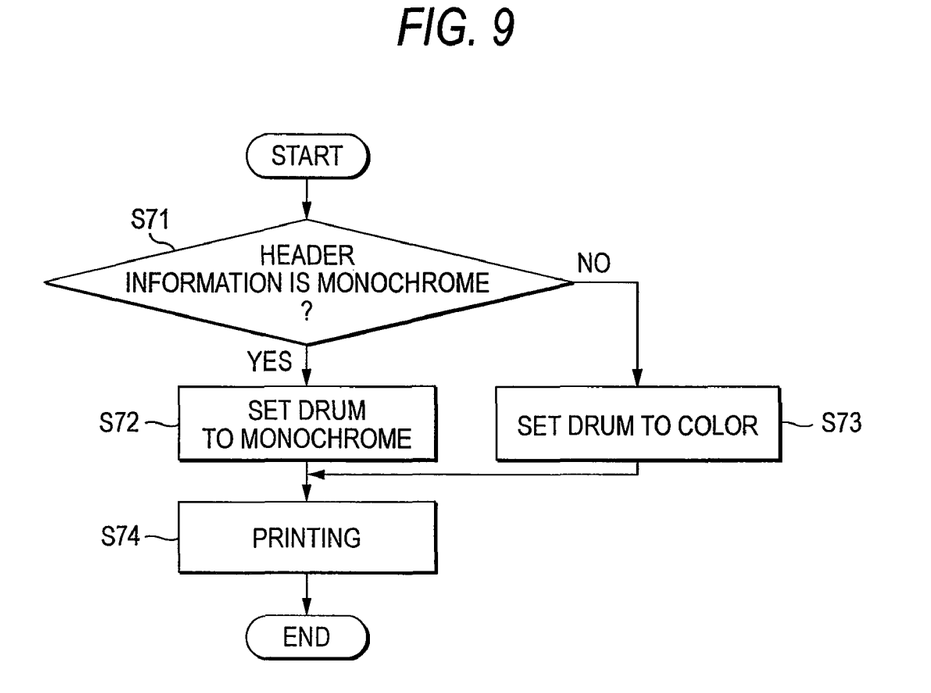
FIG. 9 is a flowchart showing the modification of processing of a printer side in the control system.

The processing which analyzes the printing data and judges whether the printing data is monochrome data may be executed by the PC 800. FIGS. 8, 9 are flowcharts showing the processing of the aspect. FIG. 8 shows the processing in the PC 800. The CPU 811 starts the processing based on the program stored in the HDD 814 as the recording medium when the OK button 913 is pressed down in the printing UI 910 illustrated in FIG. 6.

When the processing is started, first, it is judged whether the monochrome printing is instructed as the color mode by the printing UI 910 in S50. When the monochrome printing is not instructed (S50: N), it is judged whether the file name of the printing data is registered into the print information in S51 as an example of the control section. The above print information is registered into the HDD 814 of the PC main body 810 in this aspect. Then, in S51, it is judged whether the file name and file update date/time of the printing data that the printing is instructed by the printing UI 910 are registered into the print information. Immediately after the purchase of the PC 800, the print information is empty, and a negative judgment is conducted in S51, and the processing proceeds to S52.

The whole printing data is analyzed in S52 as an example of the analysis section. In the following S53, it is judged whether the printing data is monochrome printing data based on the analysis result. When the printing data is not monochrome printing data (S53: N), information that the printing data is color is stored in the header attached to the printing data in S54. On the other hand, when the printing data is monochrome printing data (S53: Y), information that the printing data is monochrome is stored in the header attached to the printing data in S56. Furthermore, the file name and file update date/time of the printing data are registered into the print information in S57 as an example of the file name memory section. When the monochrome printing is instructed by the printing UI 910 (S50: Y), or when the file name and file update date/time of the printing data have already been registered into the print information (S51: Y), information that the printing data is monochrome is stored in the header attached to the printing data in S58. In S54, S57 or S59 following S58, the transmission of the printing data and header thereof is started via the printer port interface 860, and the processing ends once.

Next, FIG. 9 is a flowchart showing the processing of the control part 10 in this aspect. The control part 10 starts this processing when receiving the printing data from the PC 800. When the processing is started, first, in S71, it is judged whether the information stored in the header is monochrome. When the information is monochrome (S71: Y), after the photoconductorphotoconductor drum 3 is set to monochrome in S72, the processing proceeds to S74. When the information is not monochrome (S71: N), after the photoconductorphotoconductor drum 3 is set to color in S73, the processing proceeds to S74. In S74, after the printing is executed by driving the printer engine 200 while analyzing the received printing data, the processing ends once.

The degradation and depletion of the toners of yellow, magenta and cyan in printing the monochrome printing data can be promptly and exactly suppressed in this aspect as well as the foregoing aspect. When the monochrome printing is instructed by the printing UI 910 even in this aspect (S50:Y), the processing does not proceed to the analysis processing in S52 and the registration processing of the file name in S57. Thereby, the file name of the multicolor printing data can be prevented from being accidentally registered into the print information. Furthermore, in this aspect, the file name and the file update date/time are registered into the print information in pairs. Therefore, when the printing data of the same file name is converted into color from monochrome, the printing data can be color-printed.

The present invention is not limited to each of the aspects at all, and can be implemented in various forms in the range where the aspects are not deviated from the gist of the present invention. For example, the present invention can also be applied to the image forming apparatus which uses a so-called intermediate transfer belt. In this case, the intermediate transfer belt and the transfer roller are equivalent to the transfer section. Although the commands in which the monochrome printing or the color printing should be implemented is stored as information in the header in each of the aspects, these commands may be another command different from the image data.

The identification information may include the filename, the file name and the update date (update date/time), a part of the image data, hash data of the image data, thumbnails and the combination thereof.

Furthermore, although the photoconductor drums 3Y, 3M, 3C are isolated from the sheet feeding belt 6 in printing the monochrome image in each of the aspects, the development units 51Y, 51M, 51C may be separated from the photoconductor drums 3Y, 3M, 3C. In this case, the photoconductor drums 3Y, 3M, 3C may be rotated during the printing. The degradation and depletion of the toners of yellow, magenta and cyan can be suppressed by stopping the development rollers 52Y, 52M, 52C.

What is claimed is:

1. An image forming apparatus comprising:
    a plurality of image carriers on which latent images according to image data corresponding to different colors are respectively formed;
    a plurality of development sections for respectively developing the latent images formed on the image carriers using development agents having different colors;
    a transfer section for superimposing and transferring the development agents developing the latent images formed on the image carriers on a sheet;
    an input section into which the image data are input;
    an analysis section for analyzing whether the image data input into the input section is monochrome image data only when image formation in multicolor is instructed by the image data;
    an identification information storage section for storing identification information capable of identifying the image data when the analysis section analyzes that the image data is monochrome image data; and
    a control section for prohibiting at least the operation of the development sections corresponding to some colors when the identification information of the image data input into the input section corresponds to the identification information stored in the identification information storage section only when image formation in multicolor is instructed by the image data.

2. The image forming apparatus according to claim 1, wherein the development sections corresponding to some colors corresponds to colors other than black.

3. The image forming apparatus according to claim 1, wherein the identification information is a file name.

4. The image forming apparatus according to claim 1, wherein the identification information includes a file name and an update date.

5. A non-transitory computer readable medium storing a software program to control an image forming apparatus including
    a plurality of image carriers on which latent images according to image data corresponding to different colors are respectively formed;
    a plurality of development sections for respectively developing the latent images formed on the image carriers using development agents having different colors;
    a transfer section for superimposing and transferring the development agents developing the latent images formed on the image carriers on a sheet; and
    an input section into which the image data are input,
    the software program enabling a computer to function as:
    an analysis section for analyzing whether the image data input into the input section is monochrome image data only when image formation in multicolor is instructed by the image data;
    an identification information storage section for storing identification information capable of identifying the image data when the analysis section analyzes that the image data is monochrome image data; and
    a control section for prohibiting at least the operation of the development sections corresponding to some colors when the identification information of the image data input into the input section corresponds to the identification information stored in the identification information storage section only when image formation in multicolor is instructed by the image data.

6. An image forming system comprising:
    an image forming apparatus for forming an image on a sheet comprising:
        an input section into which the image data are input;
        a plurality of image carriers on which latent images according to image data corresponding to different colors of the image data input into the input section are respectively formed;
        a plurality of development sections for respectively developing the latent images formed on the image carriers using development agents having different colors; and
        a transfer section for superimposing and transferring the development agents developing the latent images formed on the image carriers on the sheet; and
    a higher-level apparatus connected to the image forming apparatus comprising:
        a data output section for outputting image data to the input section of the image forming apparatus;
        an analysis section for analyzing whether the image data output by the data output section is monochrome image data only when image formation in multicolor is instructed by the image data;
        an identification information storage section for storing identification information capable of identifying the image data when the analysis section analyzes that the image data is monochrome image data; and
        a command output section for outputting a command for prohibiting at least the operation of the development sections corresponding to some colors to the image forming apparatus when the identification information of the image data output by the data output section corresponds to the identification information stored in the identification information storage section only when image formation in multicolor is instructed by the image data.

7. The image forming system according to claim 6, wherein the analysis section conducts the analysis only when image formation in multicolor is instructed to the image data.

8. The image forming system according to claim 6, wherein the development sections corresponding to some colors are development sections corresponding to colors other than black.

9. The image forming system according to claim 6, wherein the identification information is a file name.

10. The image forming system according to claim 6, wherein the identification information includes a file name and a update date.

11. A method for controlling an image forming apparatus, the image forming apparatus including a plurality of image carriers on which latent images according to image data corresponding to different colors are respectively formed;

a plurality of development sections for respectively developing the latent images formed on the image carriers using development agents having different colors;

a transfer section for superimposing and transferring the development agents developing the latent images formed on the image carriers on a sheet;

the method comprising:

analyzing whether the image data input into the image forming apparatus is monochrome image data only when image formation in multicolor is instructed by the image data;

storing identification information capable of identifying the image data when analyzing that the image data is monochrome image data; and prohibiting at least the operation of the development sections corresponding to some colors when the identification information of the image data newly input into the image forming apparatus corresponds to stored identification information only when image formation in multicolor is instructed by the image data.

* * * * *